March 24, 1964  E. D. HINDENBURG  3,125,909
PRECISION STRIPPER BLADES
Filed March 14, 1961  2 Sheets-Sheet 1
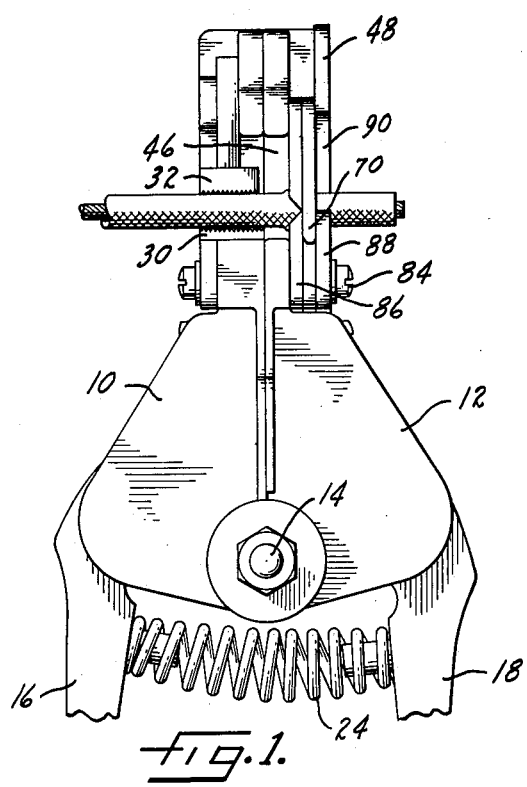
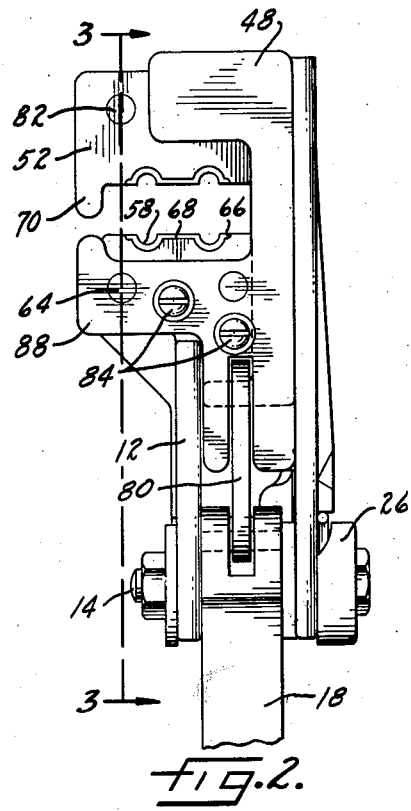
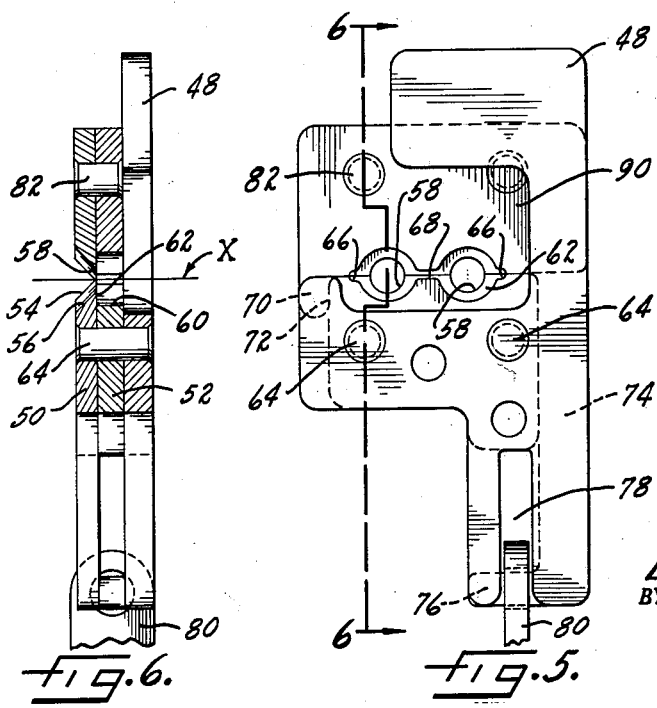
INVENTORS
Eugene D. Hindenburg,
BY Parker & Carter
Attorneys.

March 24, 1964  E. D. HINDENBURG  3,125,909
PRECISION STRIPPER BLADES

Filed March 14, 1961  2 Sheets-Sheet 2

INVENTOR.
Eugene D. Hindenburg
BY Parker & Carter
Attorneys.

3,125,909
PRECISION STRIPPER BLADES

Eugene D. Hindenburg, Sycamore, Ill., assignor to Ideal Industries, Inc., Sycamore, Ill., a corporation of Delaware
Filed Mar. 14, 1961, Ser. No. 95,658
3 Claims. (Cl. 81—9.5)

This invention is in the field of wire strippers and is primarily concerned with a hand operated stripper, although it should be understood that most, if not all, of the features of the invention can be used as well in other types of strippers, for example bench mounted strippers and/or power operated units and the like.

A primary object of the invention is blades for wire strippers which will not nick the conductors.

Another object is a highly precise and accurate set of blades for either hand or power operated strippers.

Another object is stripper blades which possess the advantages of both the knife and die type stripper blades without the disadvantages of either.

Another object is stripper blades which provide for greater flexibility in the wire sizes they will accommodate.

Another object is stripper blades which insure accurate lateral centering of the cutting edges.

Another object is a blade structure for strippers which causes the knife edges to cut through the insulation at the same time.

Other objects will appear from time to time in the ensuing specification and drawings in which:

FIGURE 1 is a plan view of hand type wire strippers with my invention;

FIGURE 2 is a side view of FIGURE 1;

FIGURE 5 is an enlarged view of a portion of FIGURE 2 with the blades closed;

FIGURE 6 is a section along line 6—6 of FIGURE 5;

Figure 4:
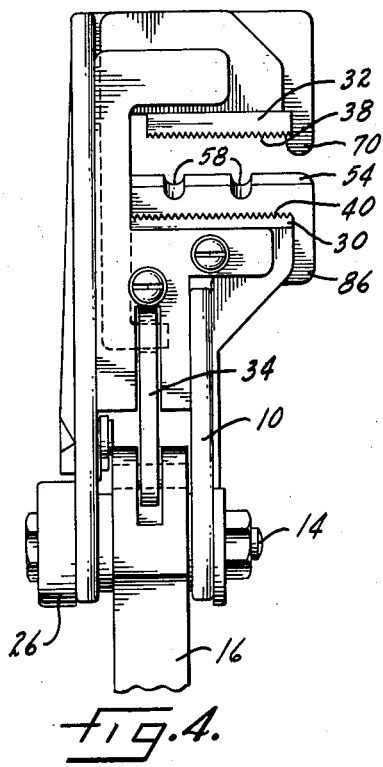
FIGURE 4 is a left side view of FIGURE 1.

In the drawings, I have shown a hand stripper of the type generally illustrated in U.S. Patent 2,523,936, issued September 26, 1950, but it should be understood that the invention may be applied as well to a bench stripper, such as shown in U.S. Patent 2,239,755, issued April 29, 1941. For details of the particular hand stripper involved, reference is made to the above patents.

Generally the stripper includes a pair of body members or arms 10 and 12 pivoted together at 14 which also functions as the pivot for a pair of legs or handles 16 and 18. Note in FIGURE 3 that the handles 16 and 18 have inner arms or extensions 20 and 22 which extend into the pivot 14. The handles 16 and 18 are spring biased apart by a suitable coil spring 24 or the like and I also provide a suitable coil spring, not shown, in a housing 26 on the back of the pivot 14, each end of which is anchored into one of the arms 10 and 12 to bias them together at all times. For example, FIGURE 1 shows the arms together and FIGURE 3 the arms apart, it being understood that the coil spring around the pivot in the housing 26 always resists the opening movement of the arms.

I provide a suitable latch 28 either between the arms or otherwise to initially resist or restrain the return movement of the arms to allow the jaws to open so that the wire can be removed after stripping with a certain delay period so that a stranded wire will not be frayed, as shown in detail in Patent No. 2,523,936.

In one arm, I mount certain clamping jaws, as at 30 and 32. As shown, the lower such jaw 30 is stationary while the upper jaw 32 moves up and down. To provide for such movement, a link 34 is pivoted on one end of the handle 16 and on its other end on a depending tail 36 of the jaw. The opposed faces 38 and 40 of the clamping jaws grip and hold the outer insulation of a wire to be stripped positioned between them. While I have shown the lower jaw as stationary and the upper jaw movable, it should be understood that it may be reversed. Or I may make both jaws movable to a common central plane or axis, as shown in U.S. Patent No. 2,842,992, issued July 15, 1958.

Figure 3:
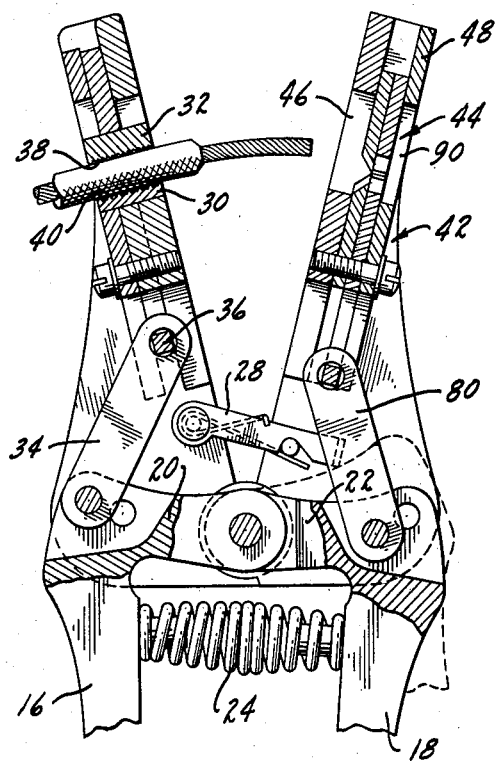
FIGURE 3 is a section taken along line 3—3 of FIGURE 2, with the blades in operation.
Figure 7:
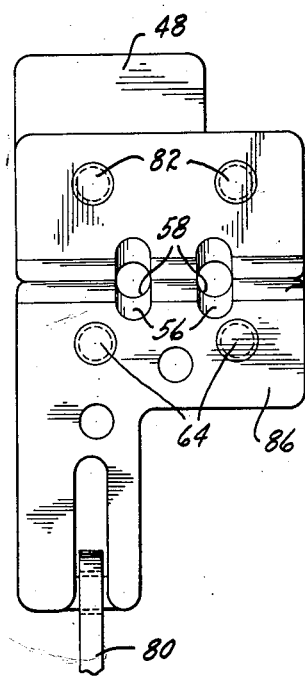
FIGURE 7 is a left side view of FIGURE 5.
Figure 8:
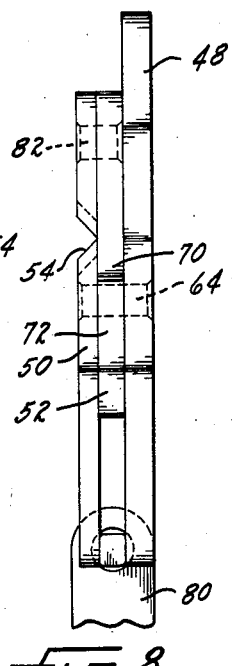
FIGURE 8 is an end view of FIGURE 5.

On the other arm 12, I mount cutting blades with, as shown in this case, the bottom blade 42 stationary and the top blade 44 movable, although it might be reversed or both movable. The upper arm itself is L-shaped in cross section with the front and outside open and the back and inside closed, thereby defining an outwardly opening pocket having a suitable opening or slot 46 through the inside. The blade structure proper is mounted in the trough or on the outside of the L-shaped cross section, as shown in FIGURE 3, and is suitably held in place by a retainer plate 48, to be explained in detail hereinafter.

Considering for the moment simply the cutting and stripping blades themselves, each is shown as made up of a composite structure involving basically two parts. I shall describe in detail the lower blade, but it should be understood that the operating face, the cutting portions etc. of the upper blade, may be the same, except symmetrically opposite.

In FIGURES 5 and 6, the blade has two portions or plates 50 and 52. The working or cutting face 54 of the first plate shall be referred to as the knife edge, shown in the form of a bevel 54, which may be formed in any suitable manner at any suitable angle, for example 45°. I then mill one or more suitable grooves 56 up the face of the bevel, each of which intersects the upper edge thereof in a semicircular, knife edge notch 58, the milling being such that the notch is circular and swung on an arc about an axis designated generally X in FIGURE 6.

I have shown two such grooves and notches but it should be understood that more or less may be used, depending upon the number of wire sizes the particular blades are to accommodate.

The other plate 52 is provided with what I shall term a collet 60 for each knife edge notch, each of which is coaxial with its knife edge notch 58. It will be noted in FIGURE 5 that the diameter of the knife edge notches is substantially less than the diameter of the collet opening 60 so that a substantial amount of the end or flat wall of the back face of the knife blade, as at 62, is exposed in the collet. The diameter of the collet opening should conform more or less to the diameter of the insulation of the wire while the diameter of the knife edge notch 58 conforms to the conductor size itself.

In use, the collet opening 60 will firmly support, hold and center the wire by conforming to the insulation. At the same time, the knife edges cut through the insulation and stop just short of the wire itself. The two blades 50 and 52 which make up the blade structure are quite accurately fastened together, as at 64, so that in use the relationship between the knife edge notch and the collet opening remains the same at all times. For accurate lateral alignment, I join the retainer plate 48 to the blade structure.

To make sure that the wire to be stripped is held accurately and firmly by the collet portion 60, I deliberately made the collet opening diameter slightly less than the insulation diameter so that a slight compression fit will be acquired. This will cause the insulation to squeeze or extrude out the sides which, if it gets between the two flat portions of the collet plates 52, could prevent them from coming together. But to take care of this I slightly relieve or mill away the flat portions on each side of the collet opening, as at 66 in FIGURE 5, and I may join the two reliefs between the openings, as at 68.

The upper blade may be the same except that the outside of the collet plate is provided with a depending nose 70 which just fits beyond and, therefore, slides down the outside of the lower collet plate, as at 72 in FIGURE 5. The inside of the upper collet plate has a depending tail 74 which slides along the inner surface of the lower collet plate with an inturned toe on the bottom end thereof, as at 76, straddling the lower end of a downwardly opening slot 78 in the guide plate. A link 80, as shown in FIGURE 3, is connected between the toe 76 and the handle 18 to provide movement of the upper blades up and down. The upper collet and blade plates are fastened together, as at 82, to make them, in effect, unitary.

The lower blade, along with the retainer plate, may be suitably connected to the upper arm by screws 84 or the like, which hold the entire blade structure in proper position on the arm 12 and allow the upper blade to be reciprocated up and down. It should be noted that when the upper blade comes down and closes against the lower blade, the nose 70 slides along the outer edge of the lower collet plate, as at 72, in between the projecting outer portions 86 and 88 of the lower blade plate and retainer plate, respectively. Thus, the projection 70 is held accurately, both laterally and longitudinally, when the two blades come together. The center of the retainer plate is also provided with a suitable opening 90 which matches or faces generally the opening 46 through the arm 12. Since the tail 74 of the upper collet plate slides along the inner edge of the lower collet plate at the same time that the projection 70 slides along the outer surface of the lower collet plate, at 72, I provide accurate alignment of the plates and blades when they come together by accurate machining of the parts during manufacture.

The use, operation and function of my invention are as follows:

There are basically two types of stripper blades, first, the knife type and, second, the die type. Normally, knife type blades are made by milling or grinding a grooved surface at an angle which will generate a sharp cutting edge on one face of the blade. This sharp edge is continuous along the length of the blade.

The grooves must be made smaller than the insulation O.D. to provide the cutting action needed and to provide sufficient shoulder to pull off the insulation "slug." The notches must, however, be larger than the conductor O.D. or the blades will damage the conductor.

Part of the cutting action is done by the notch and part by the sections of the cutting edge adjoining the notch. Ideally, the cutting edges of a pair of blades will cleanly sever the insulation, leaving a minimum annular section immediately surrounding the conductor, this section being determined by the clearance necessary to prevent nicking of the conductor.

The main advantages of the knife type blades are that they are relatively simple to produce; they are universal in application in that they can accommodate a wide range of insulation types and thicknesses; they provide total engagement of the insulation by a sharp edge; they provide a right angle shoulder to pull off the insulation slug; and they provide a cutting action with a minimum of applied force.

The main disadvantage is that the knife configuration provides no method or way of regulating the penetration of the insulation by the cutting edges—one blade may cut deeper than the other—which will damage the conductor.

Die type blades are normally made by forming a longitudinally hourglass shaped hole exactly on the center plane of two mating blade sections.

The lateral cross section formed when the two blade halves are separated shows a large diameter hole in which a V-shaped annular ridge forms a smaller diameter hole with a relatively sharp apex. The smaller hole is the cutting or stripping hole while the larger diameter is the colleting or counterbore hole. The stripping hole diameter is designed to equal the conductor diameter plus a few thousandths of an inch clearance. The counterbore diameter is made equal to or slightly smaller than the insulation O.D. The counterbore, because it rides the insulation, prevents penetration of either cutting edge through the conductor. The coutnerbore also serves to maintain the conductor concentric with the stripping hole while the conductor is being withdrawn from the insulation slug.

The chief advantage of the die type blade is that by closely matching the stripping hole and counterbore to the individual wire, it is possible to make a blade which will consistantly strip the wire without marking the conductor.

The main disadvantages of the die type blades are that they are not universal, meaning that each blade will strip only that size and type of wire for which it is specifically designed; they require considerably more applied force to cut and remove insulation; they do not have a sharp edge; and the cutting edge is not continuous, meaning that there is no sharp edge except for the circumference of the stripping hole which will cause the insulation to be pinched by the small triangular projections which are the cross sections of the annular ridge and by the sides of the counterbore hole if the insulation is out-of-round or exceeds the exact counterbore diameter, the result being that the insulation will not be cleanly or completely cut and must be broken to complete the strip.

I combine these two types of cutter blades with joint improvements into one stripper to get the advantages of each and avoid the disadvantages of both. I provide a knife type blade which will cut straight through the insulation. I thereby avoid the disadvantage of the collet type blade which normally will pinch the insulation on each edge. At the same time, I provide a colleting action which accurately centers the wire by piloting or guiding the insulation, and I thereby avoid the disadvantage of a knife type blade coming together at different times against the wire proper and nicking it.

It will be noted that the knife blades cannot come together through the insulation against the wire at different times. The collets guarantee that the wire will be accurately centered when the circular knife edge notches come together. The wire will be directly between the two notches. Also, the knife edge notches insure that all of the insulation will be cut and there will be no pinching, squeezing or tearing of the insulation without an actual clean sheer.

I prefer to make each blade out of two plates, one a knife plate and the other a collet plate. Each can then be made separately and brought together in a sandwich structure or composite. But in certain situations it should be understood that I may make both the knife edge and collet out of one piece of material which would require that I bevel one edge at, for example, 45°, gang mill the grooves 56 up to the knife edge notches 58 and then counterbore the other side to form the collets 60 stopping precisely and exactly in the plane of the knife edge notches 58, something that is not easy to do.

Making the two, the knife and collet, out of completely separate plates and then riveting them together is much simpler, much more accurate, and much less expensive, the only requirement being that care must be devoted to accurately positioning the two relative to each other when they are riveted together.

I prefer that the collet or bore be slightly under size relative to the normal diameter of the insulation of the wire so that the insulation will be compressed somewhat when the collet blades come together and hold the wire firmly and accurately. This may cause some pinching or extruding at the edges, but this can be easily taken care of by relieving the edge planes, in the manner shown. This gives much greater flexibility on the collet diameter as to how many wire sizes I can accommodate without sacrificing the accuracy of the centering action of the collets.

I also get accurate lateral positioning of the upper blade when it comes down to perform a cutting and stripping action by sliding an outer nose, as at 70 in FIGURE 2, into a pocket formed on the outside of the lower blades. Since the inside of the upper plate is in the form of a depending tail which slides along the inside of the lower plate, I am assured of an accurate lateral centering of the blades.

While I have shown and described the preferred form of my invention, it should be understood that suitable additional modifications, changes, substitutions and alterations may be made without departing from the invention's fundamental theme. For example, I have shown the blades in a stripper of the type shown in U.S. Patent No. 2,523,936, but they might be used as well in a stripper of the type shown in U.S. Patent No. 2,943,043, issued June 19, 1960. Also, they could be used with the type of stripper shown in U.S. Patent No. 2,842,992, issued July 15, 1958. I might also use the blades in a stripper of the type shown in U.S. Patent No. 2,770,154, issued November 13, 1956.

With these and other modifications in mind, I wish that the invention be unrestricted, except as by the appended claims.

I claim:

1. A blade structure for use in a wire stripper, a pair of opposed blades, at least one being movable toward the other to define an opening and closing action between them, the opposed portion of each blade having two areas, the first being a generally semi-cylindrical collet, and the second being an insulation cutting knife with a wire hole formed in the edge thereof having a diameter substantially less than the diameter of the collet and generally concentric therewith, the diameter of the collet being slightly less than the diameter of the insulation on the wire to be stripped, and further including relief areas laterally on each side of the collet so that when the insulation on the wire is compressed by the blades coming together, it may flow into the relief areas.

2. In a blade structure for use in a wire stripper, a pair of opposed blades mounted so that at least one may move toward the other, and means for operating them to define an opening and closing action, each blade being made of two separate parts, one part having an insulation cutting knife on its working surface with a semicircular notch on the edge thereof conforming to the size of the wire, the other part having a semi-cylindrical collet concentric with but on a substantially larger diameter than the notch and having a diameter on the order of the insulation diameter of the wire to be stripped, the diameter of the collet being slightly less than the insulation of the wire to be stripped, and further including relief areas laterally on each side of the collet so that when the insulation on the wire is compressed by the blades coming together, it may flow laterally into the relief areas.

3. A blade structure for use in a wire stripper or the like for removing the insulation surrounding a metallic conductor, a pair of opposed blades, at least one being movable toward the other to define an opening and closing action between them, the opposed portion of each blade having two areas, the first such area being a generally semi-cylindrical collet, relief areas laterally on each side of the collet and the second such area being an insulation cutting knife with a wire hole formed in the edge thereof having a diameter substantially less than the dimension of the collet and generally concentric and co-axial therewith, the dimension of the collet being slightly less than the diameter of the insulation on the wire to be stripped and the diameter of the wire hole being on the order of just slightly greater than the diameter of the metallic conductor so that when the opposed portions of the blades close around such a wire, the insulation on the wire will be compressed somewhat by the collet to accurately center the metallic conductor relative to the wire hole, the insulation and the wire may flow into the relief areas, and when the opposed blades are fully closed, the wire hole on the second portion will not nick the metallic conductor.

References Cited in the file of this patent

UNITED STATES PATENTS

| | | |
|---|---|---|
| 731,688 | Kleinschmidt | June 23, 1903 |
| 1,305,513 | Bernard | June 3, 1919 |
| 1,396,903 | Weber | Nov. 15, 1921 |
| 1,578,340 | Miller | Mar. 30, 1926 |
| 2,386,328 | Rollings | Oct. 9, 1945 |
| 2,523,936 | Axelsen | Sept. 26, 1950 |
| 2,723,575 | Thomson | Nov. 15, 1955 |
| 2,842,016 | Miller | July 8, 1958 |
| 2,871,740 | Andren | Feb. 3, 1959 |
| 2,889,728 | Hindenburg | June 9, 1959 |
| 2,929,284 | Hagstrand | Mar. 22, 1960 |
| 3,019,679 | Schwalm et al. | Feb. 6, 1962 |

FOREIGN PATENTS

| | | |
|---|---|---|
| 822,126 | France | Sept. 13, 1937 |
| 619,302 | Germany | Sept. 27, 1935 |